United States Patent Office 3,048,362
Patented Aug. 7, 1962

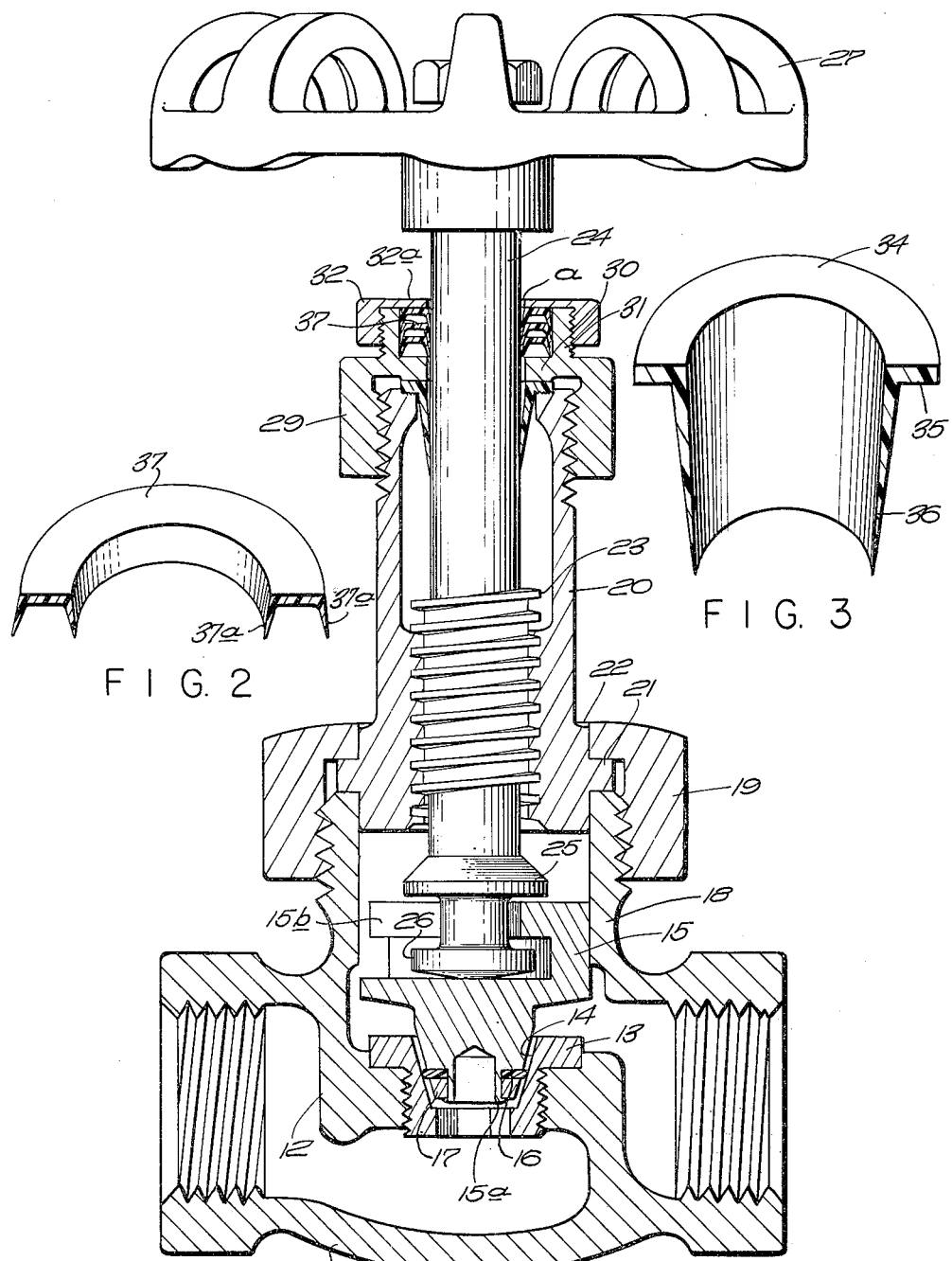

3,048,362
CRYOGENIC VALVE
Collin W. Scarborough, Egypt, Mass., assignor to Walworth Company, New York, N.Y., a corporation of Massachusetts
Filed Feb. 11, 1960, Ser. No. 8,040
2 Claims. (Cl. 251—214)

My present invention relates to valves intended particularly for use where gases or liquids which may produce gases are to be transmitted, and extremely low temperatures may be encountered. In such cases the temperature of the gas or liquid may be extremely low while the temperatures of the surrounding atmosphere may be much higher. An illustration is liquid nitrogen which has a boiling point of —320° F. at atmospheric pressure. While the valve embodying my invention is particularly useful for the transmission of liquefied gases which on release from pressure produce extremely low temperatures, it will be understood the valve is useful for other substances and under other conditions.

It has been found that valves when used to control the flow of such substances may become inoperable due to the formation of ice on and between the moving parts, particularly in the tiny space between the surface of the valve stem and the interior surface of the hole in the bonnet or other part through which the valve stem passes. This is sometimes known as an ice bridge and often requires considerable force to break it and to open or shut the valve. A long ice bridge combined with very low temperatures may make it impossible to turn the valve without the exertion of force beyond that which the valve parts can withstand. In such cases a wrench with a long handle is likely to be used and the valve stem to be injured or broken. To overcome this difficulty, valve stems have been made extremely long so that the place where the ice might otherwise be formed is warm enough to prevent it. This construction is clumsy and expensive and not altogether effective when extremely low temperatures are encountered. Research also indicates that when an ice bridge is broken by turning the valve stem, chips or flinders of ice remain on the stem, which may pass down through the stem seal with operation of the stem, or melt and drain down, rendering the stem seal less effective.

The problem is a complicated one. Not only must the entrance of moisture along the stem and the formation of a long ice bridge be prevented but also the leakage of gas past the stem from within the valve. Furthermore, the materials from which sealing rings are made contract more than the surrounding metal at low temperatures and have a tendency to plastically deform and therefore the clamping nuts have to be tightened from time to time. Accordingly, it is desirable to be able to do this from the outside without disassembling the valve or the use of special tools.

In the valve embodying my invention, the ice bridge which can be formed is such as to require a negligible shearing force and the stem can be sealed against leakage at very low temperatures. Therefore, no stem extension is required. The valve is also sealed so that the entrance of moisture from the outside air which otherwise might form an ice bridge at the main stem seal is prevented.

Referring now to the drawings:

FIGURE 1 is a vertical section, the valve stem being shown inside it in elevation.

FIGURE 2 is a section of one of the sealing rings.

FIGURE 3 is a vertical section of the gas seal.

Referring now to FIGURE 1, there is shown at 11 a valve body having the usual partition 12 in which is screwed a conical valve seat 13 having the usual sloping sides shown at 14. At 15 is shown a valve plug, the lower end of which is conical to correspond with the conical interior surface 14 of the valve seat 13. The valve plug 15 is provided with a sealing ring 16 held in place by a washer 17 which itself is secured by the peened over edges 15a of the central tubular projection of the valve plug. This construction forms no part of my invention.

The valve body 11 is formed with the usual screw threaded bonnet 18 on which is a bonnet cap or nut 19. The bonnet 18 is extended upwardly by a stem sleeve 20 provided with an annular rib 21 which is engaged by the inner flange of the bonnet cap 19. The stem sleeve 20 is formed with screw threads 22 on its interior to engage screw threads 23 on the valve stem 24.

At the bottom of the valve stem 24 are two flanges 25 and 26 separated by a space into which enter the arms 15b of a fork on the top of the valve plug 15. When the valve stem is turned by the valve handle 27 and raised, the upper surface of the flange 26 will engage the under surface of the arms 15b of the fork and pull the valve plug 15 up; and, conversely, when the valve stem is screwed down, the flange 25 will engage the valve plug 15 and push it down seating its conical lower end against the sloping wall of the valve seat 13.

Secured to the top of the stem sleeve 20 by screw threads is a hollow stem sleeve cap 29 which is provided with an inwardly extending flange 30 and a tubular upwardly extending screw-threaded projection 31 on which is a stuffing box cap 32.

A gas seal 34 (see FIG. 3) having a flange 35 rests on the upper surface of the stem sleeve 20. This gas seal 34 is conical as shown at 36 so that the pressure of the gas in the space surrounding it forces it against the surface of the stem 24 and produces a gas-tight joint. The gas seal 34 is made of suitable plastic material, for instance, a tetra-fluoro-ethylene polymer such as that sold under the name Teflon or the similar material sold under the name Rulon or Kel–F which is a polymer of tri-fluorochloroethylene. Other similar materials may be used. The inwardly extending flange of the stem sleeve cap 29 rests on the flange 35 of the gas seal and compresses it against the upper surface of the stem sleeve 20 forming a gas-tight seal at this point. Altogether the flange of the gas seal 34 which when compressed against the flange of the stem sleeve and the conical downward extension of the gas seal which rests against the valve stem form a perfect barrier against the escape of any gas from the chamber formed by the interior of the stem sleeve 20 and the valve stem.

Inside the tubular projection 31 of the stem sleeve cap 29 are one or more sealing rings 37 made of Teflon, Rulon or Kel–F or other suitable material. These rings, one of which is shown in cross section in FIG. 2, are provided with two flaring flanges 37a, the inner of which rests against the stem and the other of which rests against the inner wall of the projection 31 of the stem sleeve cap 29. In practice, I use one or more of these rings 37 and the upper of the rings before compression extends above the upper edge of the screw-threaded sleeve 31 on the stem sleeve cap 29. The stuffing box cap 32 has an inwardly extending end surface or flange 32a which contacts the uppermost ring 37 so that when the stuffing box 32 is screwed down the seal ring or rings 37 are compressed and forced inwardly against the outer surface of the stem 24 and the inner surface of the tubular projection 31 on the stem sleeve cap 29. The inner edge a of the radial end surface or flange 32a of the stuffing box cap 32 is very thin i.e. a minimum practical thickness so that the area of contact of the end surface and the valve stem is small thereby reducing the size of any possible ice bridge which may form between the stem and the edge of the flange. By making this surface very small, the stuffing box cap is still strong enough to compress the sealing rings but so small that no substantial ice bridge can form. Therefore, turning of the valve stem can be initiated with a reasonable force.

Since the stem sleeve cap 29 may be adjusted from the outside, a seal can be established between flange 35 of gas seal 34 and the shoulder of stem sleeve 20 after contraction due to low temperatures and plastic deformation of the seal material without releasing the pressure on the line. The sealing rings 37 when compressed by the stuffing box cap 32 form a moisture tight contact with the stem 24 and therefore prevent any formation of ice between them and the stem. The gas seal 34 (see FIG. 3) prevents the escape of gas from the valve chamber, and the effect of low temperatures is to cause the lip 36 of seal 34 to contract more tightly around the stem 24. Therefore, the construction provides a valve which will not be frozen by an ice bridge because of the narrow area of contact between the stem and stuffing box cap, one which moisture cannot enter and pass along the stem to form an ice bridge lower down in the valve or disturb the primary stem seal and one from which gas cannot escape along the stem, or out through the stem sleeve cap.

I claim:

1. In a valve to be exposed to low temperatures, a valve body having an upwardly-extending exteriorly screw-threaded portion, a cooperating valve member and valve stem, a stem sleeve cap screwed onto said threaded portion of said valve body and having an exteriorly screw-threaded tubular extension, a compressible gas seal in said upwardly-extending portion of said body and engaging the valve stem, said stem sleeve cap having a flange portion at the base of said extension projecting inwardly toward the valve stem and resting on the gas seal and compressing it into contact with the upwardly-extending portion of the body when the stem sleeve cap is screwed down, at least one compressible moisture seal ring in the tubular extension of the stem sleeve cap engaging the stem, and a screw-threaded stuffing box cap on said screw-threaded extension of the stem sleeve cap having an integral annular end the inner peripheral edge of which extends into approximate contact with the valve stem and is very thin so that it confronts the stem with very little surface, said peripheral edge of said stuffing box cap resting directly on said moisture seal ring and having sufficient strength to compress it into sealing contact with the valve stem when the stuffing box cap is screwed down, whereby ice bridging is restricted to said edge of said cap from which it may readily be broken by rotation of said stem and whereby moisture and ice chips cannot reach said gas seal.

2. In a valve to be exposed to low temperatures and moisture, a valve body having an exteriorly-threaded hollow stem sleeve, a rotatable valve stem extending through said sleeve for actuation of a valve member within said body, a hollow truncated conical gas seal of resilient material having an integral annular rim at the base thereof and disposed within said stem sleeve in surrounding relationship with said stem and tapering inwardly toward said body with said rim resting on the outer end of said stem sleeve, a hollow stem sleeve cap screw-threaded onto said stem sleeve and having a screw-threaded tubular extension forming a stuffing box about said stem, said hollow cap screw having an inwardly-extending annular flange at the base of said extension resting on said rim of said gas seal and compressing it into gas-tight relationship with said outer end of said stem sleeve, at least one compressible moisture seal ring in the stuffing box formed by said extension, said moisture seal ring being in moisture-tight engagement with said stem and with the interior of said tubular extension, a screw-threaded stuffing box cap on said threaded extension of said stem sleeve cap having an annular end closure with an inner peripheral edge closely surrounding said stem and confronting it with a small surface area, said peripheral edge of said stuffing box cap being rested directly on said moisture seal ring in moisture-tight relationship therewith, whereby ice bridge formations between said peripheral edge and said stem will interfere only negligibly with rotation of said stem and whereby moisture and ice chips cannot reach said gas seal.

References Cited in the file of this patent

UNITED STATES PATENTS

| 1,854,051 | McAndrew | Apr. 12, 1932 |
| 2,765,185 | Mott | Oct. 2, 1956 |
| 2,986,372 | Yocum | May 3, 1961 |

FOREIGN PATENTS

| 582,523 | Great Britain | Nov. 19, 1946 |